United States Patent [19]
Prosser

[11] 3,718,592
[45] Feb. 27, 1973

[54] PROTECTION AGAINST RADIANT HEAT ENERGY

[76] Inventor: Robert A. Prosser, 15 Maire Ave, Natick, Mass. 01760

[22] Filed: Nov. 21, 1969

[21] Appl. No.: 878,945

[52] U.S. Cl. ..............................252/62, 2/81, 8/2, 250/108 FS, 252/300, 350/160 P, 8/DIG. 12
[51] Int. Cl. ..........................F16l 59/08, C04b 43/00
[58] Field of Search ................8/2, 2.5; 252/62, 300; 250/108 FS; 350/160 P; 2/81

[56] References Cited

UNITED STATES PATENTS 3,510,429   5/1970   Iserson et al. ..........................252/62

OTHER PUBLICATIONS

Textile Research Journal, August 1965 "Heat Transferred by Decomp. Products" etc., pp. 757–769.
Color Index, Volume 4, 2nd edition 1956 Society of Dyers & Colorists, Amer. Ass'n of Textile Chemists, pg. 4298.
Color Index, Volume 2, 2nd edition 1956, Society of Dyers & Colorists, Amer. Ass'n of Textile Chemists & Colorists, pg. 2773.

*Primary Examiner*—Harold Ansher
*Attorney*—Roberts, Cushman & Grover

[57] ABSTRACT

This invention relates to a process for providing protection against intense radiant heat energy such as that released by a thermonuclear explosion. The process is characterized by disposing a dye in the vapor state between the source of radiant heat energy and an object to be protected. The chromophore groups of the dye intercept photons primarily in the ultra-violet, visible and infra-red regions and reradiate and/or dissipate heat energy to the air thereby decreasing the heat energy reaching the object to be protected. The dyes contemplated by the invention are those that contain chromophore groups defined as molecules or portions thereof capable of intercepting photons and which are stable in the vapor state. In a preferred embodiment, the dye is combined with a carrier which secures the dye to a substrate to be protected and preferably is capable of vaporizing or gassing as opposed to liberating smoke, at least in part, at relatively low temperatures, as required for protection of the substrate, to liberate dye which is vaporized and propelled towards the source of radiant heat energy by the gaseous decomposition products of the carrier.

8 Claims, No Drawings

PROTECTION AGAINST RADIANT HEAT ENERGY

The Government has a non-exclusive, irrevocable, royalty-free license in the invention described herein, with power to grant sublicenses for all governmental purposes.

BACKGROUND OF THE INVENTION

1. Introduction

This invention relates to heat insulation materials (class 252, subclass 62) and more particularly, to a means for providing protection against intense radiant heat energy by disposing a dye in the vapor state between a source of radiant heat energy and an object to be protected.

2. Description of the Prior Art

It is known in the art that of the energy of a thermal nuclear air-burst, about one-third is radiated in the form of light and heat rays. For example, it is reported in Glasstone, S., *The Effects of Nuclear Weapons*, U.S. Government Printing Office, Washington, D.C., (revised 1964), page 333, that though the intense light and heat energy of a nuclear blast is distributed over a wide area, it is still sufficient in the case of a one megaton weapon to inflict first and second degree burns at radii of 14 and 11 miles respectively, and to ignite newspapers at a radius of 9 miles. In contrast, the lethal radii of gamma and neutron radiation and of blast over-pressure are about two miles. Since the area threatened by the thermal radiation is about 30 times larger than the area threatened by radiation and over-pressure, it is highly desirable to provide a system capable of providing significant protection against thermal radiation alone. From a practical standpoint, such a system must be low in cost and capable of application to a substantial number of surfaces such as a finishing on clothing, as a coating or paint on buildings, as a cosmetic for the skin and the like.

Attempts have been made in the prior art to formulate systems that might provide thermal insulation upon contact with intense radiant heat energy. One such attempt is reported by Barnes, W.B. and Yelland, W.E.C., *Degradation of Halopolymers by Exposure to High-Intensity Thermal Pulses*, Materials Research and Engineering Report Number 64-4, Clothing and Organic Materials Division, U.S. Army Natick Laboratories, Natick, Massachusetts (1965), incorporated herein by reference. The purpose of the study of said report was the ultimate development of new organic polymeric materials capable of withstanding and dissipating the intense radiant thermal energy emitted during the detonation of a nuclear weapon. It was found in accordance with said report that certain halogenated polymers and copolymers such as polyvinylidene fluoride and polytrifluoroethylene, when subjected to intense radiant heat energy, exhibited relatively good thermal energy-dissipating characteristics, though the reason for this was not fully understood by the authors.

STATEMENT OF THE INVENTION

The present invention is for an improved means for providing protection against intense radiant heat energy. Though similar in behavior to some of the halopolymers described in the above referenced Materials and Engineering Report, the subject invention differs by deliberately deploying a vaporizable dye between the source of radiant heat energy and an object to be protected. The dye used can be in the pure state, or be produced or result from another material during a decomposition process, preferably in high yield. Moreover, the dye can be organic, inorganic, organo-metallic and may include pigments. Examples of such dyes would include any member selected from the group consisting of carotene, xanthone, dibenzofuran and fluorenone. The chromophore groups of the dye intercept photons primarily in the ultra-violet, visible and infra-red regions, and reradiate and/or dissipate heat energy to the air thereby decreasing the energy reaching an object to be protected. The dyes used in the subject invention must provide chromophore groups in the vapor phase which are capable of intercepting photons. In a preferred embodiment of the invention, the dye is combined with a carrier material which is capable of gassing or vaporizing as opposed to smoking as with burning at relatively low temperatures as required to protect a substrate, so as to liberate the dye and propel the same with the gaseous decomposition products of the carrier towards the source of radiant heat energy. In some situations the substrate itself may serve as a carrier, or the carrier may be omitted.

DESCRIPTION OF THE PREFERRED EMBODIMENTS

To evaluate the ability of a particular dye to act as a radiant heat shield in the vapor state in accordance with the invention, an electric arc image furnace is used to create a brief, but intense source of radiant heat energy. A substance to be tested, in the shape of a thin disc, is placed between the electric arc discharge of the furnace and a thermocouple positioned at the rear surface of the disc. The criterion for measuring thermal protection is the rise in temperature ($\Delta T$) above ambient temperature of the thermocouple.

EXAMPLES 1 – 6

In one series of experiments, a series of dyes were milled into a chlorinated wax carrier and formed into discs having a thickness of 1/16th inch. It was found that the results obtained are highly dependent upon sample thickness so that each test was performed three times and the result averaged together. The samples were irradiated in the electric arc image furnace at 18.5 cal/cm² sec. for three seconds. The results obtained are set forth in the following table:

| Ex. No. | Sample Composition | % dye | $\Delta T$(°C) |
|---|---|---|---|
| 1 | Chlorinated wax (control) | — | 19.0 |
| 2 | Chlorinated wax and beta-carotene | 0.61 | 11.7 |
| 3 | Chlorinated wax and xanthone | 0.61 | 11.3 |
| 4 | Chlorinated wax and diphenylene ketone | 0.61 | 16.1 |
| 5 | Chlorinated wax and Heliogen blue | 0.61 | 14.6 |
| 6 | Chlorinated wax and Orange G dye | 0.61 | 11.5 |

In each of the above examples, the radiant heat energy caused decomposition of the chlorinated wax. The gaseous decomposition products propelled the dye towards the source of the radiant heat energy. It can be seen that the presence of the dye in the chlorinated wax formulation of each example caused a significant decrease in the temperature rise of the thermocouple disposed behind the sample formulation.

EXAMPLE 7

It is known in the art that various creams have been tested for use as heat barriers. Such testing is reported in Radiation and High Temperature Behavior of Textiles, *Annals of the New York Academy of Sciences*, Volume 82, Article 31, "Clothing Protection in Modern Warfare," pp. 661–666.

In order to determine whether the protection offered by such cream could be improved by the addition of dyes in accordance with the invention, various cream formulations were prepared with and without dyes and tested in the electric arc image furnace using the test procedures described above.

A basic cream formulation suitable for purposes of illustration is as follows:

| Ingredient | Amount |
| --- | --- |
| Methylcellulose | 1.78 grams |
| Sorbitol (70%) | 8.17 " |
| Chlorinated Paraffin | 12.00 " |
| Tetrachloridefluorethane | 2.46 " |
| Polyvinyl pyrolidone | 1.63 " |
| Titanium dioxide | 24.50 " |
| Ferric oxide | 0.42 " |
| Distilled water | 32.10 " |
| Isopropanol | 6.2 " |
| Triethanolamine | 0.1 " |
| Stearic acid | 0.25 " |
| Magnesium carbonate | 10.40 " |

The cream is prepared by first heating together the methylcellulose, chlorinated paraffin and stearic acid at 88° C to form a first mixture. A water and oil emulsion is then formed with distilled water, sorbitol and triethanolamine. The inorganics are added to the emulsion and the emulsion and first mixture blended together. The product is divided into numerous parts.

One part of the above mixture is blended with a mixture of carbon tetrachloride (in proper proportions) and a second part is blended with carbon tetrachloride containing a Fluorenone dye in an amount sufficient to provide 1 percent by weight dye in the cream.

Each mixture is submitted to testing in the above described electric arc image furnace at 18.5 cal/cm²sec for three seconds. The cream vaporized propelling the dye towards the source of the radiant heat energy. The $\Delta T$ of the thermocouple for the sample without dye was 21.5° C while that for the sample containing the dye was 16.3° C.

EXAMPLES 8 TO 12

The procedure of example 7 was repeated using the following dyes:

9-Fluorenone
Xanthen-9-one
Heliogen Green
Heliogen Blue
β-carotene

The results obtained for the series of experiments are similar to those of Example 7 with the formulation containing the dye showing a significant decrease in $\Delta T$ in all cases.

It should be obvious to those skilled in the art that dyes other than those specifically enumerated above are suitable for purposes of the present invention. In general, the dye is one capable of providing chromophore groups in the vapor state that are capable of intercepting thermal photons, preferably by virtue of its possessing loosely held electrons. For purposes of this invention, a chromophore group is defined as any molecule or portion thereof capable of absorbing radiant energy and re-radiating and/or dissipating energy to the air and/or carrier gases. Examples of chromophore groups capable of absorbing such thermal photons and typical dyes containing these groups are as follows:

| Chromophore | Dye |
| --- | --- |
| nitroso | Naphthol Green B |
| nitro | Picric acid |
| monazo | Chrysoidine |
| disazo | Congo Red |
| trisazo | Direct black EW |
| polyazo | Columbia Fast Black G |
| azoic | p-Nitroanaline |
| stilbene | Diamine Orange D |
| diphenylmethane | Auromine O |
| triarylmethane | Malachite Green |
| xanthene | Rhodamine B |
| acridine | Acriflavine |
| quinoline | Quinoline Yellow |
| methine | Astraphloxine |
| thiazole | Primuline |
| indamine | Bindschedler's Green |
| azine | Safranine T |
| oxazine | Gallocyanine |
| thiazine | Methylene Blue |
| lactine | Resoflavine W |
| amino ketone | Helindone Yellow CA |
| anthraquinone | Alizarin Sapphire SE |
| indigoid | Indigo |
| phthalocyanine | Phthalocyanine Blue |

In addition to the above, it should also be noted that some dyes decompose at elevated temperatures to yield other different but effective dyes. Moreover, various compounds which are not considered dyes, but react or decompose at elevated temperatures to liberate a compound containing chromophore groups and/or groups with loosely held electrons are suitable for purposes of this invention. For example, the pyrolysis of various polymers yield various chromophore groups. In this respect, pyrolysis of phenolic resins yields xanthenes. Further, it is believed that phenolic-nylon composites, when pyrolyzed at 400° C provide quinoline, pyridene, and benzimidazole rings, all of which absorb in the ultraviolet and visible ranges.

It is desirable that the dye be dispersed in a carrier material. The specific carrier material used is not critical, but is preferably one that provides a large volume of gaseous decomposition products at a temperature somewhat below a temperature that would cause damage to the article being protected. For example, if the object to be protected is wood, it would be desirable that the carrier decompose without burning at a temperature of at least 25° C below the temperature at which wood chars so as to liberate the dye. Obviously, many materials meet this criterion. Typical carrier materials include the cream and chlorowax formulations described in the above examples. Other preferred carrier materials are film forming substances so that the dye may be spread uniformly over a large surface as a protective layer. Typical examples of film forming substances known in the art include polymers such as polystyrene and its alloys and copolymers such as acrylonitrile-butadiene-styrene (ABS) copolymers, cellulose acetate, cellulose propionate, ethylcellulose, polymethylmethacrylate, polycarbonate, polyamides, polyester terephthalates, polyvinyl alcohol, regenerated cellophane, ethylene oxide polymers, polyvinyl pyrrolidone, and the like. Paint formulations are a preferred class of carrier.

The amount of dye in the carrier is not critical. In general it may vary within wide limits dependent upon the specific materials used, the application, the anticipated radiant heat load, and like factors that would be apparent to the art. A typical range may vary between 0.01 to 100 parts per 100 parts of carrier.

In addition to the combination of the dye and the carrier, other materials may be included in the formulation. For example, solid, particulate materials can be dispersed throughout the carrier in addition to the dye to act as focal points for localized heating in order to assist in the vaporization of the dye. Metal oxide pigments such as titanium dioxide and iron oxide are examples of particulate materials of this nature. In this respect, these materials also function as dyes by intercepting radiant heat energy and reflecting a portion thereof. In addition, there may be included materials known to liberate substantial quantities of gases such as various blowing agents, including sodium bicarbonate, nitroguanidine, nitrosoguanidine and other propellants and explosives known in the art. The liberation of gases will cause the dye to be propelled towards the source of radiant energy, thereby by mixing with air, making the vaporized dyes a more efficient heat shield.

There are many uses to which the process of the invention can be put to protect against injurious radiation. For example, it can be used to protect homes in the event of a nuclear attack by one of two methods. In accordance with one procedure, tubing can be run along the ridge of the roof of the house and beneath the rain gutters around the entire house. This tubing would have small holes equally spaced along its length. The far ends of the tubing would be plugged. The other ends are connected to a reservoir containing a fluid dye or a fluid material containing a dye. The container would then be connected through a valve to a source of compressed gas such as a tank of nitrogen. The connections would be so arranged that, in the event of an attack with thermonuclear weapons with the valve opened, the compressed gas would force the fluid dye or fluid containing dye to sprinkle over the exterior of the house. Upon contact with thermal photons, the dye would vaporize and act as a radiant energy barrier.

In an alternate embodiment, a house could be protected by providing large sheets of a polymer film such as Mylar coated with or impregnated with a dye. The sheets could be cut to conform to the house and rolled as a shade. It could be stored along the ridge of the roof and under the gutters and, in the event of an attack by a thermonuclear weapon, the tied rolls would be released and the sheets unwould to cover the roof and sides of the house. When the radiant energy from a thermonuclear device strikes the dye or carrier-dye combinations, the dye would intercept the light energy causing the dye to volatilize and expand towards the source of light energy or the carrier to decompose in whole or in part into a gas which would propel the dye towards the source of radiant energy, where it volatilizes. The vapor then would intercept the incoming radiant energy and transfer the energy to the air as heat or radiate all or part of the energy and transfer any remaining to the air as heat. Of course, the rolls have to be tied in such a manner as to be rapidly released, and the dimensions of the sheets should be such as to cover the roof and sides of the structure when unrolled. The principle of operation is similar to the common window shade or shower curtain. In this case, if the attack is a false alarm, all that is necessary is to roll up and fasten the sheets. Alternatively, a paint carrier and dye combination could be used to paint the house.

As suggested above, the invention can also be used for protection of the skin. The dye would be dispersed in a special cosmetic which would serve as a carrier. The combination would then be applied to the skin in a thin layer. As described above, the intense energy would strike the layer and be absorbed by the dye and thus, turned into heat energy. The heat would then volatilize the cosmetic or decompose the cosmetic into gases which would drive the dye into the air between the radiant energy source and the target. If the dye is not already in the vapor state, the intense radiant energy of the source will cause it to volatilize or sublime. The dye vapor would then intercept many of the photons from the air and dissipate the energy to the air as heat.

Such a system could be used for the protection of clothes. The carrier and dyes could be different. The dyes could be encapsulated and added to the carrier, or be applied directly to the substrate to be protected. Preferably the carrier should be an inert material such as water. The dye carrier system might be sprayed on using a spray can. A heat sensitive, gas forming compound might serve as a chemical link between the substrate and the dye. The heat sensitive, gas forming link would then serve as the carrier. The carrier containing the dye could alternatively be a fiber woven directly into the fabric or the dye might be attached directly to the fiber with no carrier used. The link between the dye and carrier would have to be heat sensitive and the dye would have to sublime readily without decomposing. Alternatively, the dye could be sprayed in the air between the target and predicted source.

The process of the subject invention can also be used for thermal protection of rocket nose cones and engines. With respect to nose cones, dyes known to be stable at high temperatures with high molar absorbtivities could be distributed throughout the nose cone during manufacture or numerous holes could be drilled partially through the nose cone from the bottom. These holes could be connected to a supply of dye under nitrogen pressure. During re-entry, when the nose cone degrades to the top of a hole, the nitrogen containing the dye would flow through fissures in the char and would function as pyrolysis products dissipating heat to the environment.

A method for protecting rocket engines would be to stud the rocket motor combustion chamber and exhaust nozzle with ports that dialate with heat. The ports would be connected to a tank of fuel containing dye. If an area of the motor walls becomes too hot, the ports would expand permitting more dye and fuel to enter the combustion chamber and nozzle to form a continuous and sustained layer of dye between the burning gases and the walls of the combustion chamber and nozzle, thereby acting as a thermal insulation protecting the walls.

The process of the invention can also be practiced to protect an entire city against nuclear attack by providing a layer of dye intermediate between an air blast and the city to be protected. This can be accomplished by bursting rockets containing dye above the city in a pattern to effect total coverage. It is known that the explosion of a thermonuclear device results in three forms of destruction: light radiation, 35 percent; a shock wave, 50 percent; and high energy radiation both initial and from the fall out, 15 percent. The light energy can be used in conjunction with the dyes, to reduce, blunt, or decrease the force of the shock wave and amount of nuclear radiation which reaches a target. The light from the explosion reaches the dye almost as fast as it is generated. The dye intercepts this energy and dissipates it by heating the air. Since the dye concentration, as viewed along any radius from the point of explosion, is uneven, the air will be unevenly heated. When the shock wave strikes this unevenly heated air, its characteristics change. This has been observed during tests in the Southwest, reported in *The Effects of Nuclear Weapons*, p. 133 cited above. A thermonuclear device was exploded above an asphalt road going through the desert. The black asphalt road was heated by the light radiation which in turn heated the air above the road. Quoting from the above source, "For appropriate combinations of explosion energy yield, low burst height, and heat absorbing surfaces, an auxiliary blast wave, called a "precursor," will form and more ahead of the main in-cident wave for a limited distance. Severe modifications of the usual blast wave characteristics may occur within the precursor region. In particular, the pressure of the wave front increases more gradually, but to a lower peak value, than in a true shock wave, and the decay with distance is abnormal." Since the shock wave travels faster in the heated air, those portions of the shock wave that are in the heated regions not only get ahead of the main wave, but change direction and expand like a soap bubble. These "bubbles" may cancel each other at least in part which would result in a more gradual increase in pressure of the wave front to a lower peak value. In this process, much of the energy of the shock wave would be dissipated heating the air. While this is happening, the heated air, many millions of tons in amount, rises. This will accelerate the rise of the radioactive residues and carry them to a greater height, perhaps into the stratosphere and further dilute them. The faster the fragments rise, the less the amount of initial radiation reaching the ground, the higher they rise, the longer they will remain and decay aloft, and the more they are diluted, the less the subsequent concentration at any one place. In addition, to all this, the dyes in the heated air will also be carried away.

While the invention has been described in terms of providing protection against nuclear explosion, it should be understood that the invention has application against other sources of intense radiant heat energy such as laser beams. For example, the cream described in examples 7 through 12 might prove useful in protecting fire-fighters or other formulations could be prepared to provide protective clothing.

I claim:

1. A method for providing thermal insulative protection to an object or person against a source of intense radiant energy, said method comprising the step of disposing a vaporized dye between the source of intense radiant energy and the object or person to be protected, said dye having chromophore groups capable of absorbing photons in the ultra-violet, visible or infrared regions.

2. A method for providing protection against the thermal effects of a thermonuclear explosion, said method comprising the step of disposing a vaporized dye having chromophoric groups capable of absorbing thermal photons between the thermonuclear explosion and an object to be protected, said chromophoric groups being selected from the group consisting of nitroso, nitro, monazo, diazo, triazo, azoic, stilbene, diphenylmethane, triarylmethane, xanthene, acridine, quinoline, methine, thiazole, indamine, azine, oxazine, thiazine, lactine, amino ketone, anthraquinone, indigoid, xanthone and phthalocyanine.

3. The method of claim 2 where the dye is dispersed in a film forming carrier material.

4. The method of claim 2 where the carrier supplies both dye and propelling gases.

5. The method of claim 2 where the thermonuclear explosion is an air blast and the dye is disposed in the air between the thermonuclear explosion and the ground.

6. The method of claim 2 where the dye is dispersed in a carrier material also containing a blowing agent that vaporizes with the carrier material at a temperature below a temperature which would cause damage to an object to be protected thereby propelling the dye outward towards the thermonuclear explosion.

7. The method of claim 6 where the dye is selected from the group of carotene, xanthone, dibenzofuran, and fluorenone.

8. The method of claim 6 where the carrier is a halogenated wax.

* * * * *